United States Patent [19]

Ohba et al.

[11] 4,087,889

[45] May 9, 1978

[54] WIRE CONNECTING SLEEVE

[75] Inventors: Shintaro Ohba; Nobuhiko Hirose; Nobuhiro Sugihara; Takayuki Aikawa, all of Tokyo, Japan

[73] Assignee: Kabushiki Kaisha Saneisha Seisakusho, Japan

[21] Appl. No.: 705,572

[22] Filed: Jul. 15, 1976

[30] Foreign Application Priority Data

Jul. 18, 1975 Japan .................................. 50-99061

[51] Int. Cl.[2] ......................... H01R 5/10; F16G 11/02

[52] U.S. Cl. .................................. 24/129 W; D13/24; 16/108; 174/84 C; 403/281; 403/285

[58] Field of Search ...................... 174/84 C, 90, 94 R; D13/24; 16/108, 109; 24/115 A, 129 W, 243 A; 29/514, 517, 518; 339/276 R, 276 T, 97 C; 403/212, 274, 278, 281, 284, 285, 286, 293, 344, 373, 389, 391, 393, 397, 398, 399

[56] References Cited

U.S. PATENT DOCUMENTS

| | | | |
|---|---|---|---|
| D. 186,170 | 9/1959 | Gibson | 174/84 C X |
| 1,236,551 | 8/1917 | Dillon | 16/108 |
| 1,565,831 | 12/1925 | Vignos | 16/108 |
| 1,654,340 | 12/1927 | McIntosh | 403/274 |
| 2,035,436 | 3/1936 | Schafer | 24/243 A |
| 2,526,937 | 10/1950 | Cripe | 174/94 R X |
| 2,716,741 | 8/1955 | Ustin | 339/276 T X |
| 2,930,113 | 3/1960 | Greco | 339/276 R X |
| 3,487,161 | 12/1969 | James et al. | 174/94 R |
| 3,549,787 | 12/1970 | Churla, Jr. | 174/84 C X |

*Primary Examiner*—Laramie E. Askin
*Attorney, Agent, or Firm*—Hill, Gross, Simpson, Van Santen, Steadman, Chiara & Simpson

[57] ABSTRACT

A C-shaped wire connecting sleeve is formed having a plurality of elongated ribs pressed into part of its back portion which in turn is joined by two semi-circular end gripping portions. Upon being compressed about an enclosed wire or cable, the ribs not only strengthen the sleeve to resist undesired opening but minimize the inside radius of the enclosing sleeve to further increase the sleeve's compressive gripping force.

3 Claims, 11 Drawing Figures

WIRE CONNECTING SLEEVE

BACKGROUND OF INVENTION

1. Field of Invention

This invention relates to connecting sleeves for use about wires or cables and related goods.

2. Description of Prior Art

Wire or cable connecting sleeves, heretofore, included C-shaped devices for compression about an enclosed wire or cable. Because of inherent weaknesses, such sleeves have a tendency to spread outwardly or flatten upon being compressed about an enclosed cable. This flattening increased the inside diameter of the sleeve and thus reduced the force of compression by the sleeve on the enclosed wire or cable.

To increase the force of compression and consequently the resistance of a sleeve to open after it was compressed about an enclosed cable, it was necessary to increase the thickness of the material from which the sleeve was made. Using thicker material increased the cost of the sleeve.

Additionally, wire or cable connecting sleeves required a user to carefully select a compression tool of the proper diameter since, if the sleeve was subjected to excessive compressing force by an undersized tool, the sleeve had a tendency to rupture.

SUMMARY OF INVENTION

A connecting sleeve for wire or cable is made having a C-shaped configuration and comprises a vertical back portion being joined by two generally semi-circular-shaped end gripping portions. The vertical back portion is formed having a plurality of spaced vertical ribs.

Ends of the two semi-circular end gripping portions are spaced to provide an opening therebetween to allow a user to dispose the sleeve over a wire or cable to be enclosed by the sleeve upon compression of the sleeve.

Compression of the sleeve can be accomplished by any number of suitable compression tools which force the ends of the semi-circular gripping portions together to close the opening space therebetween. Because the ribs on the vertical back portion substantially strengthen the sleeve, a user need not exercise the care in the selection of a proper compression tool as heretofore required.

The placement of a plurality of vertical ribs on the vertical back portion of the sleeve results in several other surprising and beneficial effects. First, the ribs strengthen the entire assembly to resist any relaxing of the compressive grip about an enclosed wire or cable. Secondly, and most importantly, the ribs resist any flattening of the sleeve so as to minimize the inside radius dimension of the sleeve after compression. The prevention of flattening so as to provide a minimum inside diameter in the sleeve is of particular importance since the compressive gripping strength of the sleeve about the enclosed wire or cable is therefore maximized.

Gripping of the enclosed wire or cable is further enhanced by the ribs which indent the wire and thus add further resistance to longitudinal movement of the wire.

A sleeve having a strong compressive gripping force, therefore, is created without having to increase the thickness of the material from which the sleeve is made and thus increasing the cost of the sleeve.

DESCRIPTION OF THE PREFERRED EMBODIMENT

Figure 2:
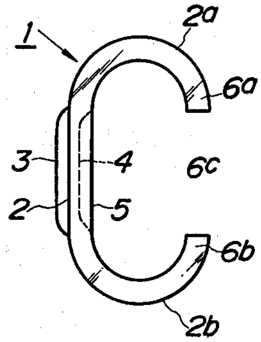
FIG. 2 is a side elevational view of a first embodiment of a sleeve according to this invention.
Figure 3:
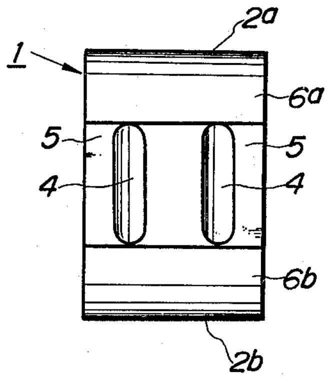
FIG. 3 is a front view of the sleeve shown in FIG. 2.
Figure 4:
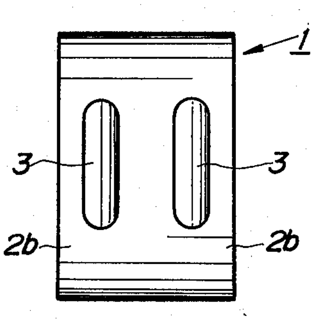
FIG. 4 is a rear view of the sleeve shown in FIG. 2.

As best seen in FIGS. 2, 3 and 4 of the drawings, a C-shaped wire or cable connecting sleeve 1 is provided having a vertical flat back portion 2 being joined at each end thereof by generally semi-circular-shaped end gripping portions **2*a* and 2*b*. The sleeve 1 has an inner gripping surface designated as 5**.

The back portion 2 is formed having a pair of outwardly protruding vertically spaced ribs 3 formed as an integral part of the back portion 2. A pair of recesses 4, complementary to the ribs 3, is formed on an interior side of the vertical back portion 2 of the sleeve 1.

The semi-circular end gripping portions **2*a* and 2*b* have ends 6*a* and 6*b* which are spaced to form an opening 6*c* of sufficient size to allow insertion of a wire or cable 20**.

By means of a suitable compression tool, the semi-circular end gripping portions **2*a* and 2*b* can be compressed about the wire 20 such that the ends 6*a* and 6*b*** respectively abut.

Figure 1:
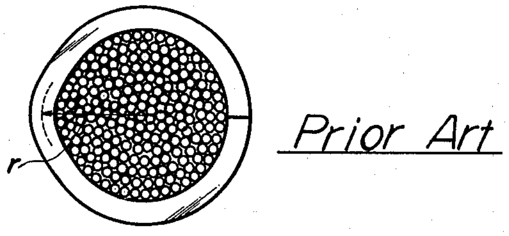
FIG. 1 is a cross-sectional elevational view of a conventional sleeve in use.
Figure 5:
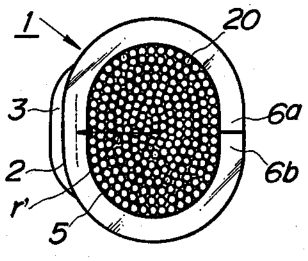
FIG. 5 is a cross-sectional elevational view of the sleeve shown in FIGS. 2, 3 and 4 in use.

When the sleeve 1 is compressed, the ribs 3 resist a flattening of the sleeve as shown in FIG. 1 so as to form an inside radius *r*. Instead, the compressed sleeve 1, as seen in FIG. 5, is formed having a smaller radius dimension *r'*, substantially increasing the compressive or holding grip of the sleeve 1 about the wire or cable 20. Additional gripping is provided by the recesses 4 since the enclosed wire 20 expands into the recesses 4 under compression.

Figure 6:
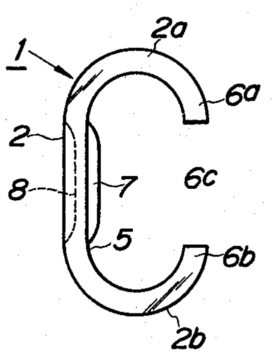
FIG. 6 is a side elevational view of a second embodiment of a sleeve of the present invention.
Figure 7:
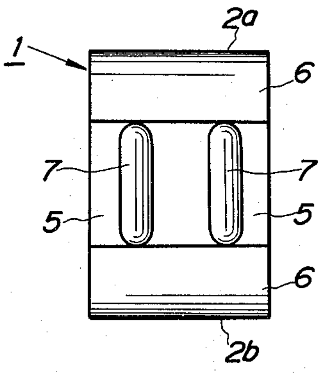
FIG. 7 is a front view of the sleeve shown in FIG. 6.
Figure 8:
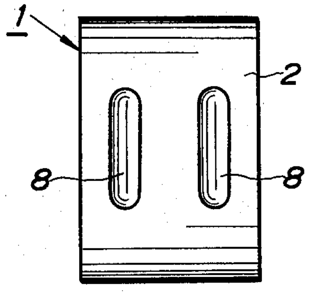
FIG. 8 is a rear view of the sleeve shown in FIG. 6.

As best seen in FIGS. 6, 7 and 8, a second embodiment of the sleeve 1 likewise is formed having the vertical flat back portion 2 joined at each end thereof by the semi-circular end gripping portions **2*a* and 2*b***.

The end gripping portions **2*a* and 2*b* likewise have respective ends 6*a* and 6*b* spaced to provide an opening 6*c* to allow insertion of the wire or cable 20**.

In the second embodiment, a pair of inwardly protruding vertically spaced ribs 7 is formed as an integral part of the interior surface of the back portion 2. A like pair of recesses 8, complementary to the ribs 7, is formed on an outside surface of the back portion 2.

Figure 9:
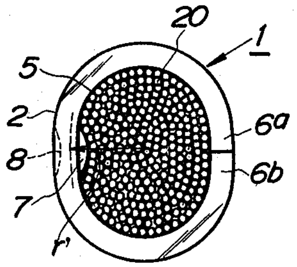
FIG. 9 is a cross-sectional elevational view of the sleeve shown in FIGS. 6, 7 and 8 in use.

As shown in FIG. 9, when the sleeve 1 is compressed about an enclosed wire or cable 20 so that ends **6*a* and 6*b* abut to close the opening 6*c*, the ribs 7 resist any flattening of the sleeve 1** so as minimize any increase in the radius dimension $r'$.

Because the ribs 7 protrude inwardly, the gripping strength of the inner gripping surface 5 is further increased because the inside cross-sectional area of the sleeve 1 is reduced by the inward protrusion of the ribs 7 which also selectively indent the enclosed wire or cable 20 to further resist longitudinal displacement of the wire 20.

The advantages of the structure of the present invention can be further appreciated when the following formula is considered. This formula is:

$$P = kZ\alpha/r$$

P = compressive gripping force of a wire sleeve
$k$ = constant
$\alpha$ = stress on the sleeve
$r$ = inside radius of the sleeve
Z = section modulus.

The compressive gripping force P is directly proportional to the section modulus which is increased by the ribs and inversely proportional to the inside radius dimension of the sleeve which is likewise minimized by the ribs.

As noted above, the sleeve 1 of the present invention exerts an extremely high wire retentive force as compared with the conventional sleeves made of the same material having the same weight. It has been found that the best effect of improving wire gripping and retentive force is produced when the ratio of the length of the ribs 3 or 7 to the inner circumferential length of inner surface 5 as measured from the end *6a* to the end *6b* is selected to be 15 to 25% in the case of the inwardly protruding ribs 7 of the sleeve body 1 and 20 to 30% in the case of the outwardly protruding ribs 3 of the sleeve body 1.

Figure 10:
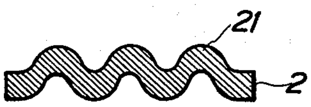
FIG. 10 is a cross-sectional view through the vertical back portion of the sleeve showing an alternate configuration of a ribbing means.

As seen in FIG. 10 is an alternate configuration of the vertical back portion 2 where ribs are formed as a plurality of vertical corrugations 21.

Figure 11:
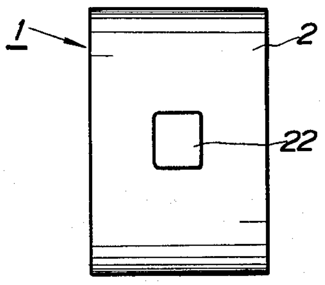
FIG. 11 is a rear elevational view of the sleeve showing another configuration of a ribbing means.

As seen in FIG. 11, the sleeve 1 is formed having a single square-shaped protrusion 22 which is a preferred configuration where the gripping strength of the sleeve 1 need not be increased to a maximum but where a minimum distortion to the enclosed wire or cable 20 is desirable.

While various modifications may be suggested by those versed in the art, it should be appreciated that we wish to embody within the scope of the patent warranted herein, all such modifications as reasonably and properly come within the scope of our claims.

We claim as our invention:

1. A wire connecting sleeve having a generally C-shaped configuration comprising:

a generally vertical back portion, a pair of curved opposed end portions integral with and extending from said back portion, said end portions being spaced sufficiently to receive a cable therebetween, a plurality of elongated ribs struck from said back portion and parallel to the lateral edges of said back portion, the presence of said ribs leaving correspondingly shaped recesses in said back portion, said ribs being confined to said back portion and terminating short of said curved opposed end portions, said ribs when extending from the outer face of the back portion constituting no more than 30% of the peripheral dimension of the C-shaped configuration, and said ribs when extending inwardly from the inner face of said back portion constituting no more than 25% of said peripheral dimension.

2. A wire connecting sleeve according to claim 1 in which said ribs extend from the outer face of said vertical back portion and constitute from 20 to 30% of the peripheral dimension of the C-shaped configuration.

3. A wire connecting sleeve according to claim 1 in which said ribs extend inwardly from the inner face of said vertical back portion and constitute from 15 to 25% of the peripheral dimension of the C-shaped configuration.

* * * * *